US009780951B2

United States Patent
Hunt et al.

(10) Patent No.: US 9,780,951 B2
(45) Date of Patent: Oct. 3, 2017

(54) PREVENTION OF FORGERY OF WEB REQUESTS TO A SERVER

(71) Applicants: Simon Hunt, Naples, FL (US); Balbir Singh, Gurgaon (IN); Nitin Munjal, Gurgaon (IN); Nitin Jaglan, New Delhi (IN)

(72) Inventors: Simon Hunt, Naples, FL (US); Balbir Singh, Gurgaon (IN); Nitin Munjal, Gurgaon (IN); Nitin Jaglan, New Delhi (IN)

(73) Assignee: McAfee, Inc., Santa Clara, CA (US)

( * ) Notice: Subject to any disclaimer, the term of this patent is extended or adjusted under 35 U.S.C. 154(b) by 0 days.

(21) Appl. No.: 13/931,120

(22) Filed: Jun. 28, 2013

(65) Prior Publication Data
US 2014/0281492 A1 Sep. 18, 2014

(30) Foreign Application Priority Data
Mar. 14, 2013 (IN) .............................. 741/DEL/2013

(51) Int. Cl.
*H04L 29/06* (2006.01)
*H04L 9/32* (2006.01)

(52) U.S. Cl.
CPC ........ *H04L 9/3223* (2013.01); *H04L 63/0428* (2013.01); *H04L 63/08* (2013.01); *H04L 63/12* (2013.01)

(58) Field of Classification Search
CPC ....... H04L 9/321; H04L 9/3223; H04L 63/12; H04L 63/0428; H04L 63/08
(Continued)

(56) References Cited

U.S. PATENT DOCUMENTS 8,468,351 B2 * 6/2013 Boesgaard Sorensen .... 713/170
8,887,290 B1 * 11/2014 Denton et al. .................. 726/26
(Continued)

FOREIGN PATENT DOCUMENTS

JP     2013-506906 A    2/2013
KR    10-0901279 B1    6/2009

OTHER PUBLICATIONS

Office Action received for Korean Patent Application No. 10-2013-116877, mailed on Jun. 19, 2014, 7 pages of Office Action including 3 pages of English Translation.
(Continued)

*Primary Examiner* — Mahfuzur Rahman
*Assistant Examiner* — Narciso Victoria
(74) *Attorney, Agent, or Firm* — Baker Botts L.L.P.

(57) ABSTRACT

Technologies for prevention of forgery of a network communication request to a server include a system for security of a network communication request. The system includes a communication module configured to receive the network communication request from a client. The network communication request may have a content parameter. The communication module may be configured to generate a string of content parameters comprising the content parameters and a hash of the content parameter, and communicate portions of a result of the network communication request to the client incorporating the encrypted string of content parameters. Furthermore, the communication module may receive a subsequent request from the client. The subsequent request may be associated with the network communication request. As a result of authenticating the subsequent request, the communication module may complete the network communication request.

14 Claims, 5 Drawing Sheets

(58) Field of Classification Search
USPC .......................................................... 713/155
See application file for complete search history.

(56) References Cited

U.S. PATENT DOCUMENTS

| | | |
|---|---|---|
| 2005/0005121 A1* | 1/2005 | Chen et al. ................... 713/171 |
| 2010/0017615 A1 | 1/2010 | Sorensen |
| 2011/0078556 A1 | 3/2011 | Prasad et al. |
| 2012/0180129 A1* | 7/2012 | Shulman et al. ............... 726/22 |
| 2012/0226813 A1* | 9/2012 | Ragusa ................. G06F 9/5027 |
| | | 709/227 |

OTHER PUBLICATIONS

Korean Office Action; Application No. 10-2013-0116877; 5 pages with English Translation, Dec. 23, 2014.
Korean Office Action; Application No. 10-2013-0116877; 6 pages with English Translation, Feb. 9, 2015.
Office Action received from Australian Patent Application No. 2013237707, dated Jan. 13, 2017; 2 pages.

* cited by examiner

PREVENTION OF FORGERY OF WEB REQUESTS TO A SERVER

RELATED PATENT APPLICATION

This application claims the benefit of Indian Provisional Application No. 741/DEL/2013, filed Mar. 14, 2013 and entitled "PREVENTION OF FORGERY OF WEB REQUESTS TO A SERVER."

TECHNICAL FIELD

The present disclosure relates generally to forgery prevention and, more particularly, to prevention of forgery of web requests to a server.

BACKGROUND

A web request forgery may include a web request sent by a malicious client on behalf of a legitimate client. The malicious client may be intending to harm the legitimate client in some manner. The web request forgery may allow the malicious client to perform unauthenticated actions. The unauthenticated actions may appear to be on behalf of a legitimate client and/or a signed-in end user. Additionally, the unauthorized actions may compromise a legitimate client's confidential data. The legitimate client may have no awareness that such actions have occurred. Further, web request forgery may lead to extra load on a server, a cloud service, or other platform, and may result in denial of service to a legitimate client.

BRIEF DESCRIPTION OF THE DRAWINGS

For a more complete understanding of embodiments of the present disclosure and its features and advantages, reference is now made to the following description, taken in conjunction with the accompanying drawings, in which.

DETAILED DESCRIPTION

Figure 1:
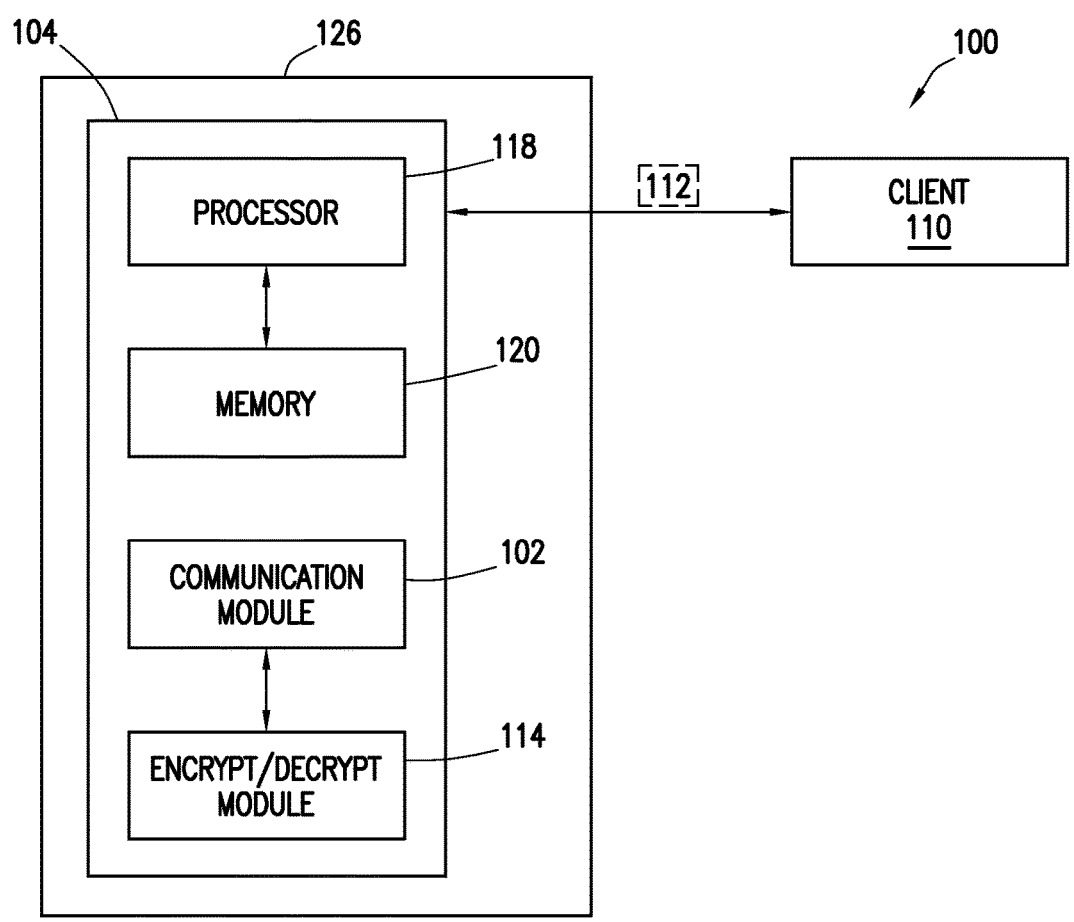
FIG. 1 illustrates an example system for prevention of forgery of web requests to a server, in accordance with some embodiments of the present disclosure.

FIG. 1 illustrates an example system 100 for prevention of forgery of web requests to a server, in accordance with some embodiments of the present disclosure. Such a server may include any suitable electronic device, including server 104. System 100 may be configured to execute communication module 102 to evaluate information such as web request 112 for forgery. In one embodiment, communication module 102 may be configured to intercept or otherwise receive web request 112. Web request 112 may be implemented by any suitable network communication request. Communication module 102 may be configured to authenticate web request 112, evaluate web request 112 as to its authentication status, and/or reject web request 112. In one embodiment, communication module 102 may be configured to choose a random session variable and append to web request 112 a hash of the content parameters of web request 112 or a cryptographic hash based on the random session variable.

Communication module 102 may be configured to execute on any suitable portion of system 100. Communication module 102 may be configured to execute on, for example, a server, computer, node, gateway, router, transmitter, or receiver. In one embodiment, communication module 102 may be executing on a network server, such as server 104. Server 104 may be implemented by any suitable electronic device, such as a computer, laptop, cloud computing server, blade, desktop, rack server, mobile device, or web server.

In one embodiment, server 104 may be communicatively coupled to or in communication with clients 110 through network 126. Network 126 may be implemented in any suitable manner, such as by a wide area network, local area network, wireless network, the Internet, an intranet, or any combination thereof. In one embodiment, server 104 may be included within network 126. In another embodiment, server 104 may be outside of network 126. Server 104 may be configured to receive traffic, such as web request 112, from outside of network 126 intended for a destination within network 126. Traffic may originate from client 110, and may include, for example, a computer, laptop, server, handheld computing device, network device, or other digital entity communicatively coupled to network 126.

Communication module 102 may reside on server 104, or on any other electronic device, server, or other suitable mechanism to scan for malware. Communication module 102 may be implemented in, for example, any application, process, script, module, executable, executable program, server, executable object, library, or other suitable digital entity. Communication module 102 may include logic or instructions for execution by a processor, such as processor 118. The logic of instructions of communication module 102 may be resident within a memory 120 communicatively coupled to processor 118.

Processor 118 may comprise, for example a microprocessor, microcontroller, digital signal processor (DSP), application specific integrated circuit (ASIC), or any other digital or analog circuitry configured to interpret and/or execute program instructions and/or process data. In some embodiments, processor 118 may interpret and/or execute program instructions and/or process data stored in memory 120. Memory 120 may be configured in part or whole as application memory, system memory, or both. Memory 120 may include any system, device, or apparatus configured to hold and/or house one or more memory modules. Each memory module may include any system, device or apparatus configured to retain program instructions and/or data for a period of time (e.g., computer-readable media). Instructions, logic, or data for encrypt/decrypt module 114 and/or communication module 102 may reside in memory 120 for execution by processor 118.

Processor 118 may execute one or more code instruction(s) to be executed by one or more cores of the processors. The processor cores may follow a program sequence of instructions indicated by the code instructions. Each code instruction may be processed by one or more decoders of processor 118. The decoder may generate as its output a micro operation such as a fixed width micro operation in a predefined format, or may generate other instructions, microinstructions, or control signals, which reflect the original code instruction. Processor 118 may also include register renaming logic and scheduling logic, which generally allocate resources and queue the operation corresponding to the convert instruction for execution. After completion of execution of the operations specified by the code instructions, back end logic within processor 118 may retire the instruction. In one embodiment, processor 118 may allow out of order execution but requires in order retirement of instructions. Retirement logic within the processors may take a variety of forms as known to those of skill in the art (e.g., re-order buffers or the like). The processor cores of processor 118 are thus transformed during execution of the code, at least in terms of the output generated by the decoder, the hardware registers and tables utilized by the register renaming logic, and any registers modified by the execution logic.

In one embodiment, communication module 102 may be communicatively coupled to encrypt/decrypt module 114 or to other portions of server 104 in order to receive and/or process web request 112. Encrypt/decrypt module 114 may perform encryption or decryption tasks on web request 112. In some embodiments, encrypt/decrypt module 114 may be implemented in, for example, any application, process, script, module, executable, executable program, server, executable object, library, or other suitable digital entity. Encrypt/decrypt module 114 may include logic or instructions for execution by a processor, such as processor 118. The logic of instructions of encrypt/decrypt module 114 may be resident within a memory 120 communicatively coupled to processor 118.

Encrypt/decrypt module 114 may be implemented by any suitable module, function, script, executable, application, logic, software, hardware, firmware, or combination thereof configured as described herein. Encrypt/decrypt module 114 may be implemented by any suitable set of files, instructions, or other digital information. Encrypt/decrypt module 114 may include a set of files or other information making up, for example, a virtual machine installation such as an operating system, a virtual deployment environment or a secured module such as a secured browser. Encrypt/decrypt module 114 may include such an installation to be installed and configured in the same way among multiple of servers 104 or clients 110. Although a single encrypt/decrypt module 114 is illustrated, server 104 may include many such images, which may include installation or disk images with a variety of content, such as different operating systems, configured in a particular way. Such images may be used to establish, for example, common virtual machine execution images on a variety of servers 104 or clients 110.

In some embodiments, encrypt/decrypt module 114 may be configured to generate random numbers, generate encryption keys (e.g., RSA keys), generate and maintain hash key tables of hardware and software components, generate and maintain configuration parameters associated with hardware and software components, wrap (e.g., encrypt) keys, unwrap (e.g., decrypt) keys and/or store keys (e.g., endorsement key, storage root key, attestation identity keys, storage keys). Encrypt/decrypt module 114 may be configured to execute multiple cryptographic functions (e.g., encryption algorithms, algorithm modes, cryptographic hashes, and/or cryptographic sign functions), and/or may be configured to load encryption keys (e.g., encryption keys provided by a software program or other entity or encryption keys) for encryption tasks.

Each client 110 may be implemented by any suitable electronic device, such as, a computer, laptop, mobile device, or server. Although an example embodiment of client 110 is illustrated, each client 110 may vary in implementation from other such clients. Client 110 may include one or more client communication modules communicatively coupled to the server. Client communication modules may be implemented in any suitable manner or by any suitable mechanism, such as by a module, function, logic, library, executable, application, script, software, hardware, firmware, or combination thereof. Client 110 may include a processor coupled to a memory. The processor may include instructions to be executed by the memory.

Web request 112 may include, for example, a webpage request and/or query. Portions of web request 112 to be analyzed by communication module 102 and may include, for example, hyperlinks, other addresses to third parties, and/or other suitable information. Communication module 102 may be configured to identify uniquely portions of web request 112 by creating a digital signature or hash based on the contents. The unique identification may be used by communication module 102 to identify web request 112.

This disclosure contemplates one or more computer-readable storage media implementing any suitable storage. In some embodiments, a computer-readable storage medium may implement one or more portions of processor 118 (such as, for example, one or more internal registers or caches), one or more portions of memory 120, or a combination of these, where appropriate. In some embodiments, a computer-readable storage medium may implement volatile or persistent memory. In some embodiments, one or more computer-readable storage media may embody software. Software may encompass one or more applications, bytecode, one or more computer programs, one or more executables, one or more instructions, logic, machine code, one or more scripts, or source code, and vice versa, where appropriate. In some embodiments, software may include one or more application programming interfaces (APIs). This disclosure contemplates any suitable software written or otherwise expressed in any suitable programming language or combination of programming languages. In some embodiments, software may be expressed as source code or object code. In particular embodiments, software may be expressed in a higher-level programming language, such as, for example, C, Perl, or a suitable extension thereof. In some embodiments, software may be expressed in a lower-level programming language, such as assembly language (or machine code). In some embodiments, software may be expressed in JAVA. In some embodiments, software may be expressed in Hyper Text Markup Language (HTML), Extensible Markup Language (XML), or other suitable markup language.

Figure 2:
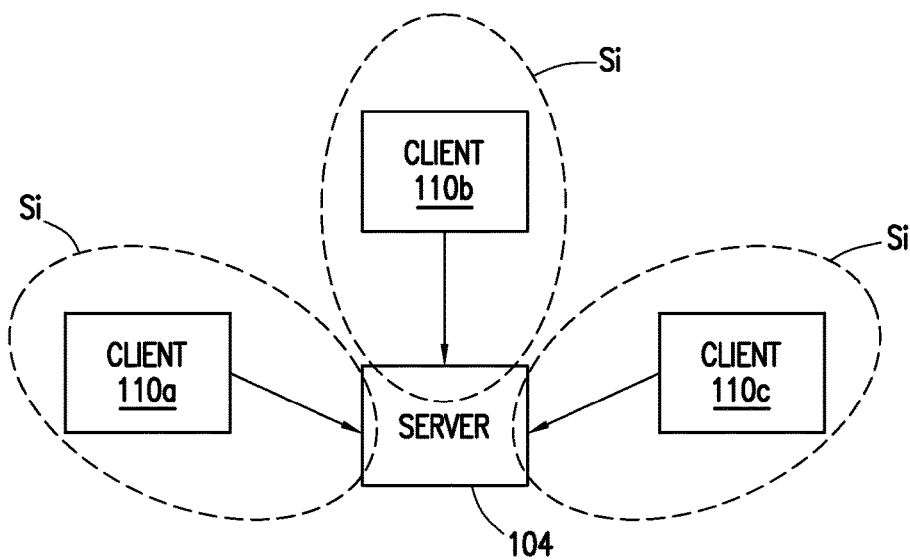
FIG. 2 illustrates an example generation of session-identifiers (ID) ($s_i$) associated with multiple clients, in accordance with some embodiments of the present disclosure.

FIG. 2 illustrates an example generation of session-identifiers (ID) ($s_i$) associated with multiple clients, in accordance with some embodiments of the present disclosure. Sever 104 may generate a session ID ($s_i$) based on initial communication, e.g., web request 112, from a client, such as clients 110a, 110b, and 110c. Each $s_i$ may be unique to a client and/or unique to a specific session (or conversation) with a client. For example, multiple communications between server 104 and client 110a may be associated with one $s_i$ until the communication terminates or completes, e.g. the web request is completed. A subsequent communication between server 104 and client 110a may generate a new $s_i$. $S_i$ may be utilized for session management and may be generated automatically by server 104.

Figure 3:
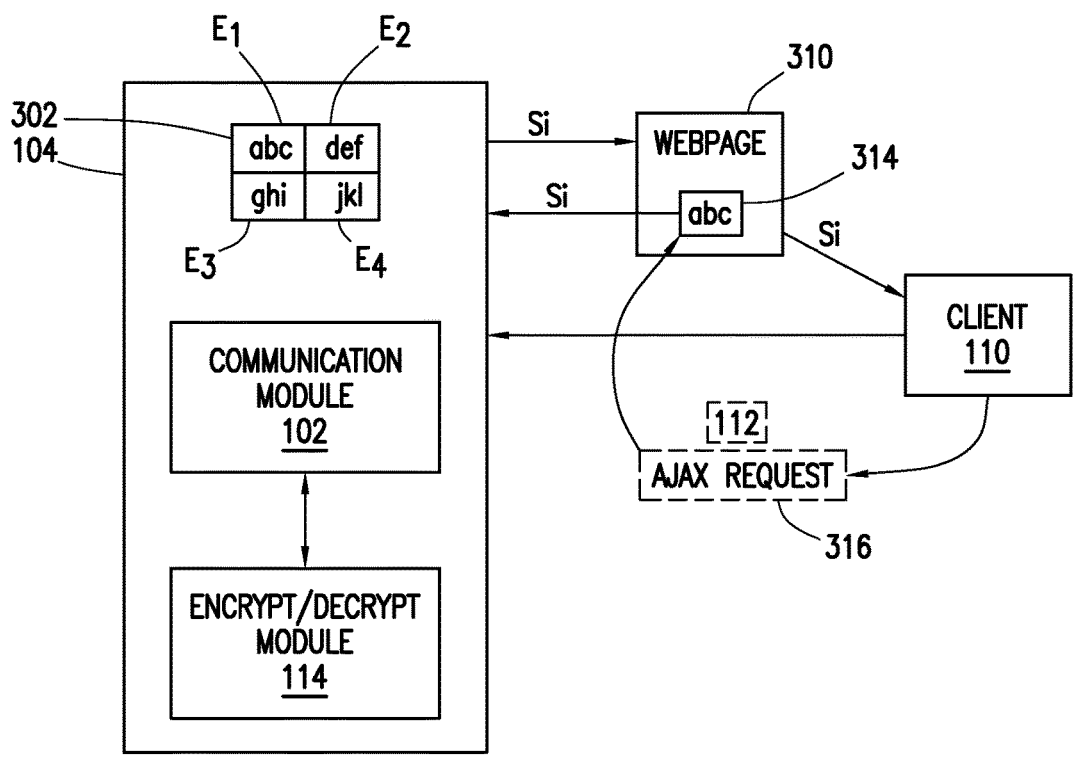
FIG. 3 illustrates an example utilization of $s_i$ to prevent forgery of web requests, in accordance with some embodiments of the present disclosure.

FIG. 3 illustrates an example utilization of $s_i$ to prevent forgery of web requests, in accordance with some embodiments of the present disclosure. Client 110 may send web request 112 to server 104 for webpage 310 that may include multiple portions of information and/or data. In some embodiments, server 104 may embed the requested webpage, e.g., webpage 310, with queries that may appear on the webpage as placeholders, such as placeholder 314. Embedding a webpage with queries may allow portions of the webpage to load quickly while portions related to the queries may load at a slower rate. This may allow a client to have some access to the requested webpage without the delay that may occur if loading the entire webpage required waiting for the results from queries. For example, utilizing queries may reduce the time taken to present client 110 with a particular data item from T to T/n, where T may be the time taken to complete n requests on server 104. Thus, the response time for webpages may be improved by loading some of the time consuming elements after other portions of the webpage loads. The time consuming elements may be loaded via subsequent requests to the server. Such loading may require APIs that can process the requests. The APIs may only be accessible by authenticated clients, such as client 110.

In some embodiments, web request 112 may include placeholder 314 for a specific element of data 302 from server 104. Data 302 may consist of multiple elements. Element 1 ($E_1$) may include a particular segment of data 302 such as "abc". Element 2 ($E_2$) may include a segment of data 302 such as "def". Element 3 ($E_3$) may include a segment of data 302 such as "ghi," and element 4 ($E_4$) may include a segment of data 302 such as "jkl". Server 104 may return portions of webpage 310, such as, header information and/or other suitable data and/or information. Server 104 may return placeholder 314 to client 110 for $E_1$, e.g. "abc". Included with webpage 310, e.g., placeholder 314, server 104 may return $s_i$ that is unique to the particular session and client 110.

Client 110 may transmit a subsequent request or call 316 to request $E_1$, e.g., "server.com?query=abc" to request "abc" for placeholder 314 For example, the subsequent request may be an asynchronous JavaScript and XML (AJAX) request. Subsequent requests may allow web applications to send data to or retrieve data from server 104 asynchronously (e.g., in the background) without interfering with the display or behavior of the existing webpage. For example, subsequent requests may include communicating data to server 104 to update parts of a webpage without reloading the entire webpage. Thus, a subsequent request may include portions of web request 112. Subsequent request 316 may include $s_i$ to establish that subsequent request 316 is originating from client 110 and not from a different source. Server 104 may populate placeholder 314 with $E_1$ or "abc".

Figure 4A:
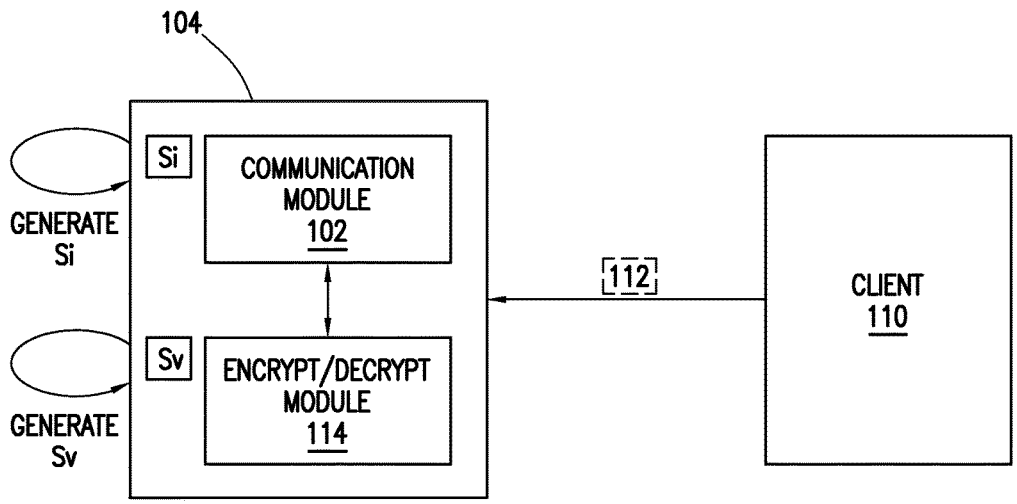
FIGS. 4A-4C illustrate an example operation of a system for preventing forgery of web requests utilizing an encryption-decryption process, in accordance with some embodiments of the present disclosure.
Figure 4B:
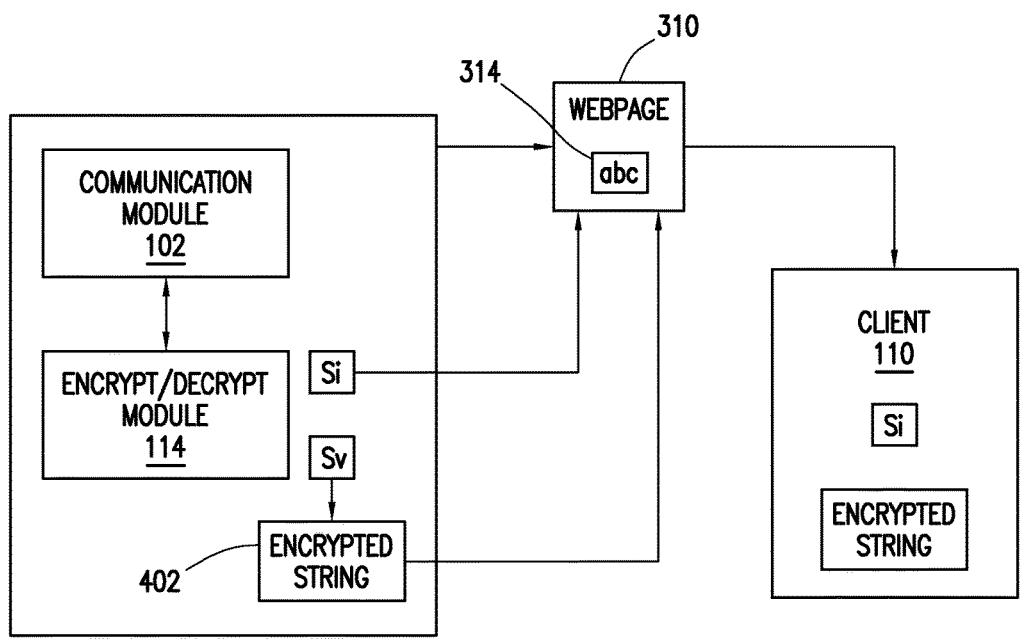
Figure 4C:
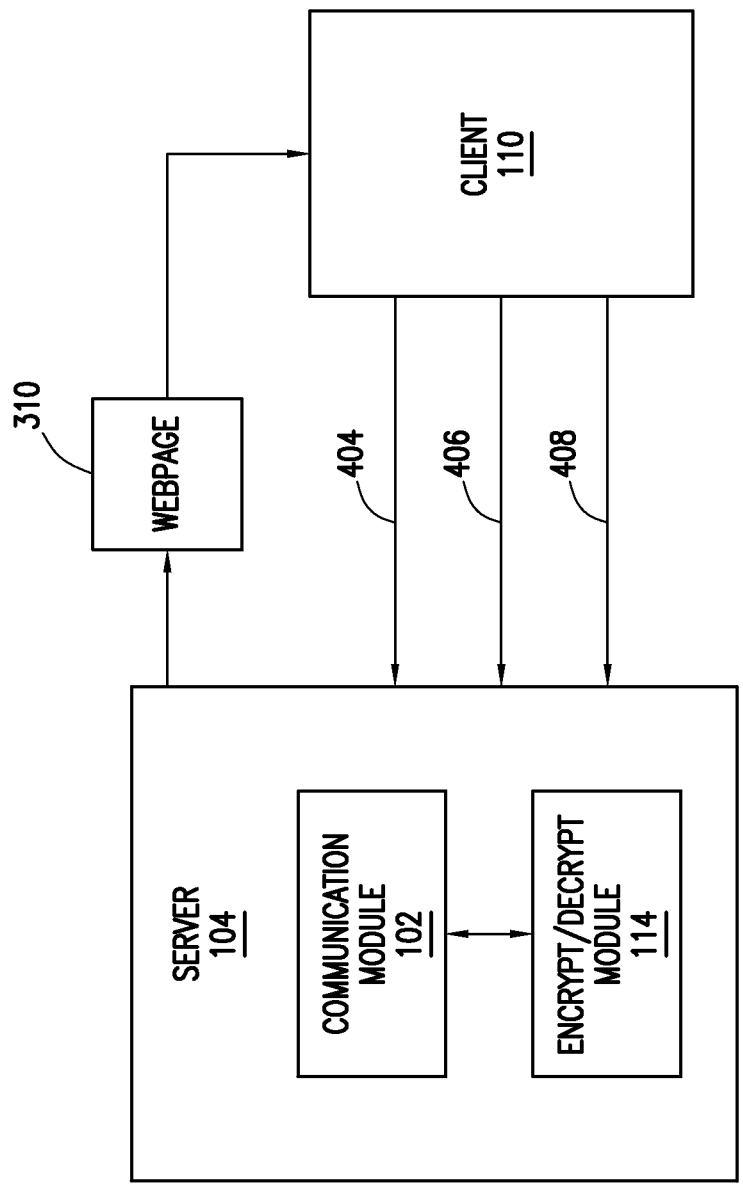

FIGS. 4A-4C illustrate an example operation of system 100 for preventing forgery of web requests utilizing an encryption-decryption process, in accordance with some embodiments of the present disclosure. FIGS. 4A-4C may utilize random session variable ($s_v$) in addition to $s_i$. $S_v$ may be a random number or character that may be unique to the session with client 110. However, in contrast to $s_i$, $s_v$ may be retained by server 104 such that only server 104 knows the value of $s_v$.

In FIG. 4A, client 110 may send a web request 112 to server 104. Web request 112 may include a request for a webpage or other suitable information. Web request 112 may include requests for content parameters for portions of the request, e.g., content for portions of a webpage. Server 104 via communication module 102 and/or encrypt/decrypt module 114 may generate $s_i$ to identify the session with client 110. Further, server 104 via communication module 102 and/or encrypt/decrypt module 114 may generate and store $s_v$ associated with client 110 and web request 112. For example, encrypt/decrypt module 114 may generate $s_v$ and store it in the user session variables on server 104. Server 104 may retain $s_v$ and may not return the value of $s_v$ to client 110, such that only server 104 may be aware of the value of $s_v$.

In FIG. 4B, server 104 may return portions of web request 112 to client 110. For example, if web request 112 requested webpage 310, server 104 may return portions of webpage 310 to client 110. Sever 104 may also return the value of $s_i$ such that subsequent requests from client 110 may be identified as originating with client 110.

Sever 104 may encrypt the response to client 110, e.g., associated with webpage 310, using an encryption algorithm based on $s_v$. For example, encrypt/decrypt module 114, or other suitable encryption system or method, may generate a hash of the content parameters associated with web request 112. The hash value may be calculated and appended to the content parameters of web request 112. Encrypt/decrypt module 114 may encrypt the resulting string of data utilizing an encryption algorithm based on $s_v$ to generate encrypted string 402. Thus, the response to client 110 from server 104 may be encrypted by an algorithm utilizing $s_v$.

In some embodiments, as discussed with reference to FIG. 3, server 104 may embed requested webpage 310 with queries. Webpage 310 may be returned based on web request 112 made by client 110. However, server 104 may send encrypted string 402 (e.g., the content parameter and the hash of the content parameter) instead of sending the actual request. For example, client 110 may request $E_1$, e.g., "abc," to populate placeholder 314, which may be the requested content parameter. Encrypt/decrypt module 114 may append a hash of the content parameter and encrypt the string via the function: encrypt (data, key). For example, the string of data may be "abc+HASH(abc)" and the key may be $s_v$ such that the entire encrypted string may be: encrypt (abc+HASH (abc), $s_v$). Accordingly, as an example, if the original queries may have been "http://server.com?param1=abc" the response may be "http://server.com?query=b23j12b3kj5b1k25jb". As a further example, an original content parameter query may be: "http://server.com?param1=ghi," while the encrypted query may be: "http://server.com?query=asdmasd999asd9sak". Since $s_v$ is known only by server 104, any attempt to forge a request for client 110 may be unsuccessful as the forger may not have access to $s_v$.

In FIG. 4C, client 110 may send multiple subsequent requests to complete webpage 310. Each of the subsequent requests may include encrypted string 402. Thus, encrypted string 402 may be utilized with any response sent to client 110 from server 104, and vice versa. Accordingly, any future subsequent requests, such as, subsequent requests 404, 406, 408, made by client 110 to server 104 may include encrypted string 402. Any malicious request may not have the same encryption because $s_v$ may only be known to server 104 and may be unique to each client 110. Thus, malicious requests may fail because server 104 may not be able to decrypt such requests to a known format. Client 110 may utilize subsequent requests 404, 406, 408 to return results from server 104. Therefore, in some embodiments, instead of sending the actual request parameter, e.g., "abc," client 110 may send the encrypted string 402, e.g., encrypt (abc+HASH (abc), $s_v$).

Server 104, via encrypt/decrypt module 114, may decrypt subsequent requests 404, 406, and 408 from client 110 to get the content parameter and hash of the content parameter. Communication module 102 may then be able to authenticate subsequent requests 404, 406, and 408 using the decrypted value. Since the key used for encryption is known only to server 104, e.g., $s_v$, any attempt to forge a request may fail. Additionally, if client 110 encrypted the content parameters with some other key, the hash comparison may also fail. After communication module 102 authenticates AJAX requests 404, 406, and 408, server 104 may return the requested information and/or data. If, however, communication module 102 fails to authenticate subsequent requests 404, 406, and 408, it may be determined that the web requests are forgeries. In such a case, either no response may be returned by the server 104 or any response returned may not be decrypted to a known format.

Figure 5:
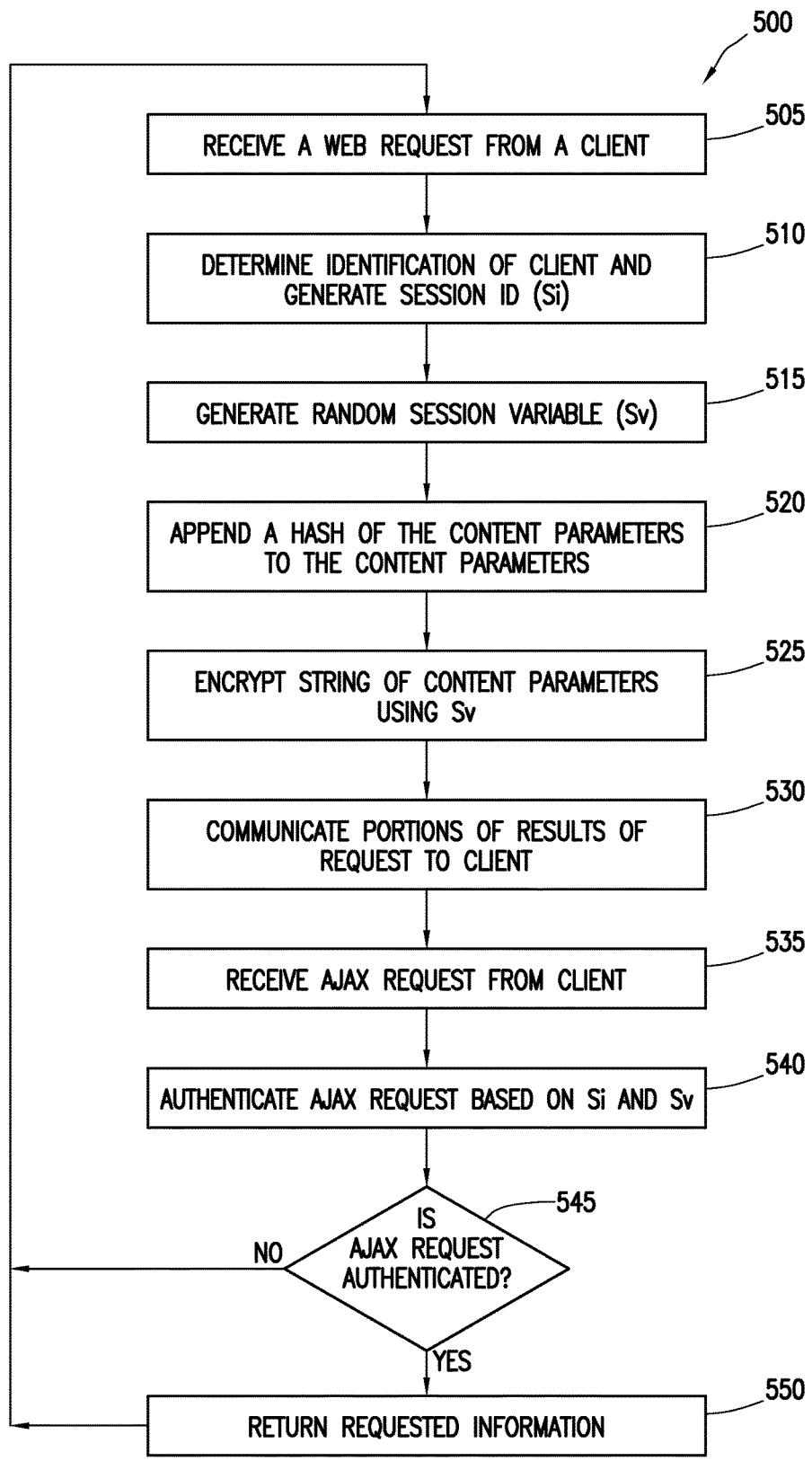
FIG. 5 illustrates an example embodiment of a method for prevention of forgery of web requests to a server, in accordance with one embodiment of the present disclosure.

FIG. 5 illustrates an example embodiment of a method 500 for prevention of forgery of web requests to a server, in accordance with one embodiment of the present disclosure. Method 500 may be performed by various computer programs, models or any combination thereof. The programs and models may include instructions stored on computer-readable medium, and operable to perform, when executed, one or more of the portions of method 500 described below. The computer-readable media may include any system, apparatus or device configured to store and retrieve programs or instructions such as a hard disk drive, a compact disc, flash memory or any other suitable device. The programs and models may be configured to direct a processor or other suitable unit to retrieve and execute the instructions from the computer-readable media. For illustrative purposes, method 500 is described with respect to network 100 of FIG. 1; however, method 500 may be used for preventing forgery of web requests on any suitable network. Further, although discussed with reference to a network, portions or all of method 500 may be executed by a component of network 100 including server 104 and/or any other suitable component.

At 505, server 104 may receive a web request 112 from client 110. At 510, server 104 may determine the identification of client 110 and generate a session ID ($s_i$) associated with client 110 and/or the current session as discussed with reference to FIGS. 2 and 3.

At 515, server 104 may generate random session variable ($s_v$) that may be unique to client 110 and/or web request 112. Server 104, communication module 102 and/or encrypt/decrypt module 114 may store $s_v$ and may not communicate the value of $s_v$ to client 110 as discussed with reference to FIG. 4A.

At 520, server 104 may generate and append a hash of the content parameters of the web request to the content parameters. For example, a hash of the content parameters may be calculated and appended to the current string of content parameters to create a new string as discussed with reference to FIG. 4A, e.g., (abc+HASH (abc)).

At 525, server 104 may encrypt the complete string of content parameters utilizing an encryption algorithm based on $s_v$. For example, with reference to FIG. 4B, the resultant encrypted string may be based on the function: encrypt (abc+HASH(abc), $s_v$). Accordingly, as an example, if the original queries may have been "http://server.com?param1=abc" to request "abc" (or $E_1$ with reference to FIG. 3) the response may be "http://server.com?query=b23j12b3kj5b1k25jb".

At 530, server 104 may communicate portions of the results of the request to the client. For example, client 110 may send web request 112 to server 104 for webpage 310 that may include multiple portions of information and/or data. Server 104 may return portions of the requested webpage e.g., webpage 310, and may embed webpage 310 with queries that may appear on the webpage as placeholders, such as placeholder 314, shown on FIGS. 3 and 4B. Further, the response back from server 104 may include the encrypted string of content parameters, e.g., encrypted string 402.

At 535, server 104 may receive a subsequent request or call from client 110. At 540, server 104 may authenticate the subsequent call based on $s_i$ and/or $s_v$. For example, communication module 102 may authenticate the subsequent requests with encrypt/decrypt module 114.

At 545, server 104 may determine if the subsequent requests are authentic. If the subsequent requests are authentic, sever 104 may return the requested information at 550. If, however, encrypt/decrypt module 114 fails to authenticate the subsequent requests, it may be determined that the web requests are forgeries. In such a case, either no response may be returned from server 104 or any response returned may not be decrypted to a known format and method 500 may return to 505.

Method 500 may be implemented using the system of FIG. 1 or 2 or any other system operable to implement method 500. As such, the preferred initialization point for method 500 and the order of the elements comprising method 500 may depend on the implementation chosen. In some embodiments, some elements may be optionally omitted, repeated, or combined. In certain embodiments, method 500 may be implemented partially or fully in software embodied in computer-readable media.

The following examples pertain to further embodiments.

A system may be configured for security of a network communication request. The system may implement any suitable portions or combination of the method or the computer-readable media described above. The system may include a communication module configured to receive the network communication request from a client. The network communication request may have a content parameter. The communication module may be further configured to generate a session variable associated with the client. The communication module may also be configured to generate a string of content parameters comprising the content parameters and a hash of the content parameter. The communication module may be configured to communicate portions of a result of the network communication request to the client incorporating the encrypted string of content parameters. The communication module may be configured to receive a subsequent request from the client. The subsequent request may be associated with the network communication request. The communication module may be configured to, as a result of authenticating the subsequent request, complete the network communication request. Authenticating the subsequent request may include verifying that the encrypted string of content parameters returns with the subsequent request. The network communication request may be a web request. The session variable may be further associated with the network communication request. The communication module may be further configured to generate a session identifier that is associated with the network communication request, and communicate the session identifier to the client. The communication module may also be configured to generate a session variable associated with the client. The communication module authenticating the subsequent request may be based on the session identifier and the session variable. Also, the subsequent request may be an asynchronous JavaScript and extensible markup language (AJAX) request. The session variable may be a random variable. Furthermore, the hash may be a cryptographic hash.

A method for preventing forgery of a network communication request to a server may be performed on an electronic device. Any suitable portions or aspects of the method may be implemented in a computer-readable storage medium or in a system, as described below. The method may include any suitable combination of elements, actions, or features. For example, the method may include receiving the network communication request from a client. The network communication request may have a content parameter. Further, the method may include generating a session variable associated with the client. The method may also include generating a string of content parameters comprising the content parameters and a hash of the content parameter. The method may include communicating portions of a result of the network communication request to the client incorporating the encrypted string of content parameters. Furthermore, the method may include receiving a subsequent request from the client. The subsequent request may be associated with the network communication request. The method may include, as a result of authenticating the subsequent request, completing the network communication request. Authenticating the subsequent request may include verifying that the encrypted string of content parameters returns with the subsequent request. The network communication request may be a web request. Furthermore, the session variable may be further associated with the network communication request. The method may also include generating a session identifier that is associated with the network communication request, and communicating the session identifier to the client. The method may include generating a session variable associated with the client. Authenticating the subsequent request may be based on the session identifier and the session variable. Additionally, the subsequent request may be an asynchronous JavaScript and extensible markup language (AJAX) request. The session variable may be a random variable. Also, the hash may be a cryptographic hash.

A computer-readable storage media may include computer-executable instructions carried on the computer readable media. Various aspects of the media may implement any suitable portions or combinations of the method described above or the system described below. The instructions may be readable by a processor. The instructions, when read and executed, may cause the processor to receive the network communication request from a client. The network communication request may have a content parameter. The processor may be caused to generate a session variable associated with the client. Further, the processor may be caused to generate a string of content parameters comprising the content parameters and a hash of the content parameter. The processor may be caused to communicate portions of a result of the network communication request to the client incorporating the encrypted string of content parameters. Also, the processor may be caused to receive a subsequent request from the client. The subsequent request may be associated with the network communication request. The processor may, as a result of authenticating the subsequent request, be caused to complete the network communication request. Authenticating the subsequent request may include verifying that the encrypted string of content parameters returns with the subsequent request. The network communication request may be a web request. The session variable may be further associated with the network communication request. The processor may also be caused to generate a session identifier that is associated with the network communication request, and communicate the session identifier to the client. The subsequent request may be an asynchronous JavaScript and extensible markup language (AJAX) request. Additionally, the session variable may be a random variable. Further, the hash may be a cryptographic hash.

All examples and conditional language recited herein are intended for pedagogical objects to aid the reader in understanding embodiments of the disclosure and the concepts contributed by the inventor to furthering the art, and are construed as being without limitation to such specifically recited examples and conditions. Although embodiments of the present disclosure have been described in detail, it should be understood that various changes, substitutions, and alterations could me made hereto without departing from the spirit and scope of the disclosure.

What is claimed is:

1. A system for security of a network communication request comprising a processor, a memory, an encrypt/decrypt module, and a communication module, the system configured to:
    receive the network communication request from a client, the network communication request having a content parameter;
    generate a hash of the content parameter;
    subsequent to generation of the hash of the content parameter, append the hash of the content parameter to the content parameter to generate a string of content parameters comprising the content parameter and the hash of the content parameter;
    generate a session variable that is unique to the client, wherein the session variable is a random variable, and wherein only the communication module is provided access to the session variable;
    encrypt the string of content parameters using the session variable;
    communicate portions of a result of the network communication request to the client incorporating the encrypted string of content parameters;
    receive a subsequent request from the client, the subsequent request associated with the network communication request;
    authenticate the subsequent request by verifying that the encrypted string of content parameters returns with the subsequent request; and
    as a result of authenticating the subsequent request, complete the network communication request.

2. The system of claim 1, wherein the network communication request is a web request.

3. The system of claim 1, wherein the session variable is further associated with the network communication request.

4. The system of claim 1, wherein the subsequent request is an asynchronous JavaScript and extensible markup language (AJAX) request.

5. The system of claim 1, wherein the hash is a cryptographic hash.

6. A method for network communications, comprising:
    receiving, at a server, a network communication request from a client, the network communication request comprising a request for a content parameter;
    generating a hash of the content parameter;
    subsequent to generating the hash of the content parameter, appending the hash of the content parameter to the content parameter to generate, at the server, a string of content parameters comprising the content parameter and the hash of the content parameter;

generating, at the server, a session variable that is unique to the client, wherein the session variable is a random variable, and wherein only the server is provided access to the session variable;

encrypting, at the server, the string of content parameters using the session variable;

communicating portions of a result of the network communication request to the client incorporating the encrypted string of content parameters;

receiving, at the server, a subsequent request from the client, the subsequent request associated with the network communication request;

authenticating the subsequent request by verifying that the encrypted string of content parameters returns with the subsequent request; and as a result of authenticating the subsequent request, completing the network communication request.

7. The method of claim 6, wherein the network communication request is a web request.

8. The method of claim 6, wherein the session variable is further associated with the network communication request.

9. The method of claim 6, wherein the subsequent request is an asynchronous JavaScript and extensible markup language (AJAX) request.

10. The method of claim 6, wherein the hash is a cryptographic hash.

11. One or more non-transitory computer readable storage medium, comprising computer-executable instructions carried on the one or more computer readable storage medium, the instructions readable by a processor, the instructions, when read and executed, causing the processor to:

receive a network communication request from a client, the network communication request comprising a request for a content parameter;

generate a hash of the content parameter;

subsequent to generation of the hash of the content parameter, append the hash of the content parameter to the content parameter to generate a string of content parameters comprising the content parameter and the hash of the content parameter;

generate a session variable that is unique to the client, wherein the session variable is a random variable, and wherein only the processor is provided access to the session variable;

encrypt the string of content parameters using the session variable;

communicate portions of a result of the network communication request to the client incorporating the encrypted string of content parameters;

receive a subsequent request from the client, the subsequent request associated with the network communication request;

authenticate the subsequent request by verifying that the encrypted string of content parameters returns with the subsequent request; and as a result of authenticating the subsequent request, complete the network communication request.

12. The medium of claim 11, wherein the network communication request is a web request.

13. The medium of claim 11, wherein the session variable is further associated with the network communication request.

14. The medium of claim 11, wherein the subsequent request is an asynchronous JavaScript and extensible markup language (AJAX) request.

* * * * *